US006226885B1

(12) United States Patent
Korich

(10) Patent No.: US 6,226,885 B1
(45) Date of Patent: May 8, 2001

(54) MEASURING JIG

(76) Inventor: George P. Korich, 7 Pierce St., No. 1, Leominster, MA (US) 01453

( * ) Notice: Subject to any disclaimer, the term of this patent is extended or adjusted under 35 U.S.C. 154(b) by 0 days.

(21) Appl. No.: 09/183,136

(22) Filed: Oct. 30, 1998

(51) Int. Cl.$^7$ .................................................. G01B 5/04
(52) U.S. Cl. ................................ 33/760; 33/758; 33/770
(58) Field of Search .................................. 33/567.1, 758, 33/760, 768, 770, 465, 468, 469

(56) References Cited

U.S. PATENT DOCUMENTS

| 293,647 | * | 2/1884 | Getty et al. | 33/567.1 |
|---|---|---|---|---|
| 1,034,068 | * | 7/1912 | Bley | 33/469 |
| 1,230,901 | * | 6/1917 | Houghton | 33/469 |
| 2,619,134 | | 11/1952 | West . | |
| 2,745,447 | | 5/1956 | Studley, Jr. . | |
| 2,747,625 | | 5/1956 | Small . | |
| 3,807,269 | | 4/1974 | Mertes . | |
| 3,811,196 | | 5/1974 | Smith . | |
| 3,935,767 | | 2/1976 | McClay, Jr. . | |
| 3,965,579 | | 6/1976 | Woods . | |
| 4,557,170 | | 12/1985 | Ingham . | |
| 4,642,898 | * | 2/1987 | Miller | 33/768 |
| 4,967,482 | * | 11/1990 | Hoover et al. | 33/760 |
| 5,077,910 | * | 1/1992 | Smith | 33/760 |
| 5,113,596 | | 5/1992 | Meyers | 33/770 |
| 5,187,877 | * | 2/1993 | Jory et al. | 33/465 |
| 5,197,365 | | 3/1993 | Clifton . | |
| 5,291,664 | * | 3/1994 | Pinney, Jr. et al. | 33/768 |
| 5,379,670 | | 1/1995 | Ferry . | |
| 5,390,425 | * | 2/1995 | Gilberts | 33/770 |
| 5,390,426 | * | 2/1995 | Hull | 33/770 |
| 5,406,711 | * | 4/1995 | Graham | 33/770 |
| 5,481,810 | * | 1/1996 | Hastings et al. | 33/768 |
| 5,782,007 | * | 7/1998 | Harris | 33/770 |
| 5,809,662 | * | 9/1998 | Skinner | 33/768 |
| 5,873,174 | * | 2/1999 | Kraft | 33/770 |
| 5,915,806 | * | 6/1999 | Levee | 33/468 |

FOREIGN PATENT DOCUMENTS

| 1545905 | * | 11/1968 | (FR) | 33/760 |
|---|---|---|---|---|
| 2214647 | * | 9/1989 | (GB) | 33/770 |

* cited by examiner

Primary Examiner—G. Bradley Bennett
(74) Attorney, Agent, or Firm—O'Connell Law Firm

(57) ABSTRACT

A measuring jig preferably comprising an end engaging member for engaging a mitered end of a work piece, a mechanism for retaining a distal end of a measuring device adjacent to a reference point on a work piece, and member for retaining a measuring device. The invention may be supplemented by a measuring device such as a tape measure. The end engaging member is founded upon a base member with an end face engaging surface and a rear longitudinal face engaging surface coupled thereto to define a V-shaped angular alcove. The end face engaging surface may be fixed relative to the rear longitudinal face engaging surface, or it may be pivotally coupled for selective angular adjustability. The mechanism for retaining a distal end of a measuring device may be slidably retained along an elongate end face engaging surface. There may be a plurality of spaced-apart mechanisms, each comprising a slot, for retaining a distal end of a measuring device. In certain embodiments, the end face and rear longitudinal face engaging surfaces may project symmetrically from both sides of the base member so that work pieces can be engaged on both sides and from both directions. The member for retaining a measuring device may include an upstanding retaining arm for receiving a clip of a tape measure and one or more angularly-disposed marking edges for allowing the application of a cutting line to a work piece. An elongate ridge may be disposed on the member for retaining a measuring device for maintaining a given orientation.

24 Claims, 9 Drawing Sheets

MEASURING JIG

FIELD OF THE INVENTION

The present invention relates generally to measuring devices. Stated more particularly, the invention disclosed herein relates to a measuring jig for retaining a distal end of a measuring means adjacent to a reference point on a work piece to enable a measuring of a length of the work piece.

BACKGROUND OF THE INVENTION

One will realize that measuring operations are relevant and useful in a wide variety of arts. However, one particular area that demands accurate, consistent, and expeditious measuring is in the field of carpentry. Indeed, doing so may fairly be considered integral to the proper completion of a given task.

When completing a measurement, it is standard practice in carpentry to employ a measuring means such as a tape measure to measure from a distal end of a work piece to a length along the work piece to which one seeks to cut the work piece. When the appropriate length measurement is reached, one normally will apply a mark of some kind to indicate the desired cutting location.

Unfortunately, as any person who has tried to measure a work piece of any substantial length will attest, as the length of a work piece to be measured increases so does the proportional difficulty in accurately, consistently, and rapidly measuring a cutting length. With a very long length to be measured, the distal end of the work piece and the measuring means must of necessity be significantly distant from the proximal end of the work piece, the main housing of the tape measure, and, of course, the person seeking to measure the work piece.

Consequently, retaining the distal end of the measuring means adjacent to a reference point at the distal end of the work piece can prove difficult and frustrating. With the distal end of the measuring means beyond his or her reach, a person seeking to measure a work piece can find himself or herself helpless to prevent the end of the measuring means from slipping from the reference point on the work piece. Furthermore, the measuring person can be plagued with uncertainty as to whether the distal end of the measuring means is truly aligned with the desired reference point. Consequently, the length to which a work piece is actually measured and cut can differ markedly the intended length. In some cases, such a result can render the work piece unusable scrap. In every case, however, the time spent in measuring and cutting the work piece is wasted and the user experiences at least some level of frustration.

Furthermore, even where a user is able to measure a work piece to a desired cutting length, it is commonly difficult to apply a cutting line to the work piece simultaneously with the measuring operation. For example, a user often is compelled to employ an additional tool for applying a cutting line to the work piece. This commonly is the case where a miter cut is to be made to a work piece. In such situations, a user often must employ a separate angular template to apply a cutting line to the work piece with, for example, a pencil.

With the foregoing in mind, it becomes clear that a device presenting a solution to one or more of the aforementioned difficulties commonly experienced by those seeking to apply an accurately measured cutting line to a work piece would be useful. However, it is still more clear that a device presenting a solution to each and every one of the afore-mentioned needs while providing a number of heretofore unrealized advantages would represent a marked advance in the art.

SUMMARY OF THE INVENTION

Advantageously, the present invention has a principal object of providing a measuring jig that retains the end of a measuring means adjacent to a distal end of a work piece to be measured whereby a single user can accurately and consistently measure a length to which a work piece is to be cut.

In preferred embodiments, it is a more particular objective of the present invention to provide a measuring jig that retains the end of a measuring means adjacent to the proximal end of an angled end face of a work piece to be measured whereby a user can measure a length to which a mitered work piece is to be cut.

It is a still further object of the invention to provide such a measuring jig that adapts to work pieces of different widths and miter angles.

Preferred embodiments of the invention have the still further object of providing a jig that presents symmetrical opposed sides whereby the measuring jig can be employed in both first and second measuring directions.

It is another object of the invention to provide such a measuring jig that is simple and economical in manufacture and use.

An equally important object of the present invention is to provide such a measuring jig that is readily portable for ease of transportation. One skilled in the art will realize that such a quality is particularly important to the typical carpenter who performs most work, not at a shop or the like, but instead at a given work sight. As a result, all tools and materials must be transported to the work site, and portability is essential.

Yet another object of the invention is to provide a measuring jig that enables a user to apply a cutting line to a work piece simultaneously with a measuring operation.

These and still further objects of the invention will be obvious both to one who reviews the present specification and drawings and to one who has an opportunity to make use of an embodiment of the present invention for a measuring jig.

In accomplishing the aforementioned objects, one embodiment of the present invention essentially comprises a measuring jig for measuring a work piece. The measuring jig is intended for use with a means for measuring a length of a work piece that includes a distal end and a body portion. For example, the measuring means may comprise a coilable tape measure with an extensible body portion, a distal measuring end, and indicia for indicating length measurements.

The measuring jig itself essentially comprises an end engaging member with a means for engaging a distal end of a work piece to be measured and a means for retaining the distal end of the measuring means adjacent to a reference point at a distal end of a work piece. As such, the measuring jig is readily portable and permits a measuring of a length of a work piece by a retaining of the measuring end of the measuring means adjacent to the reference point on the work piece and a measuring of a desired length by reference to the indicia on the body portion of the measuring means.

The means for engaging a distal end of a work piece may comprise an end face engaging surface and a rear longitudinal face engaging surface. Together, the end face engaging surface and the rear longitudinal face engaging surface define an alcove for receiving and engaging a distal end of a work piece. The end face engaging surface and the rear longitudinal face engaging surface may be mutually attached to a base member.

The end face engaging surface may be fixed at an acute angle relative to the rear longitudinal face engaging surface whereby the two surfaces define a V-shaped angular alcove and whereby the work piece end engaging member can be disposed in contact with a mitered end of a work piece to be measured with the end face engaging surface engaging a mitered end face of a work piece to be measured and the rear longitudinal face engaging surface engaging a rear longitudinal face of a work piece to be measured.

Alternatively, the end face engaging surface may have a first end pivotally coupled to the base member adjacent to the rear longitudinal face engaging surface. With this, the angle of the end face engaging surface relative to the rear longitudinal face engaging surface can be adjusted to define V-shaped angular alcoves of selectively adjustable angles to allow engagement of work pieces with end faces disposed at differing angles relative to a rear longitudinal face of a work piece. In such a case, the invention may include a means for fixing the end face engaging surface at a given angle such as a means for clamping the end face engaging surface into restrictive engagement with the base member or a plurality of spaced notches in the base member in combination with a selectively-operable notch engaging member operably coupled to the end face engaging surface.

In certain embodiments, the end face engaging surface may comprise an elongate surface, and the means for retaining the distal end of the measuring means may be slidably retained by the end face engaging surface. With this, the retaining means can be disposed at varying locations on the end face engaging surface and at varying distances from the rear longitudinal face engaging surface such that the retaining means can retain the distal end of the measuring means at varying distances from the rear longitudinal face engaging surface. Still further, there may be a plurality of means for retaining the distal end of the measuring means, and they may be spaced at varied distances from the rear longitudinal face engaging surface whereby the end engaging member can be employed for measuring work pieces of varying widths. In any event, the means for retaining the distal end of the measuring means may comprise a slot in the base member for receiving the distal end of the measuring means.

The measuring jig may have a base member comprising a flat plate with a first flat side and a second flat side. In such cases, an end face engaging surface and a rear longitudinal face engaging surface may project from each of the first and second flat sides of the flat plate of the base member. With this, the end face engaging surfaces and the rear longitudinal face engaging surfaces define alcoves for receiving and engaging a distal end of a work piece on both the first and second flat sides of the flat plate. As a result, the work piece engaging member is functionally symmetrical relative to the first and second flat sides of the flat plate such that work pieces can be received and engaged on both the first and second sides of the flat plate.

Ideally, the end engaging member will be employed in combination with a measuring means retaining member that includes a means for coupling a measuring means thereto. This measuring means retaining member may comprise a base plate with a first surface and a second surface and a first marking edge, which may be disposed at a miter angle relative to an orientation of the measuring means, for overlapping a work piece to be measured and providing an edge for applying a cutting line to indicate a given measured length. Furthermore, the first marking edge may be supplemented by a second marking edge in the form of a slot in the base plate disposed at a second miter angle relative to the measuring means orientation.

The means for coupling a measuring means to the measuring means retaining member may comprise a means for doing so while maintaining the measuring means at a given measuring means orientation for aligning with a length of a work piece to be measured. For example, the means for coupling a measuring means to the measuring means retaining member may take the form of an elongate arm with a first restraining ridge disposed along a first edge of the arm and a second restraining ridge disposed along a second edge of the arm.

Still further, an elongate ridge may be disposed on the measuring means retaining member for being disposed against a longitudinal edge of a work piece to be measured thereby to maintain the measuring means retaining member, including the marking edge, at a given orientation relative to a work piece to be measured.

Of course, one should remain mindful that the foregoing discussion is designed merely to outline broadly the more important features of the invention to enable a better understanding of the detailed description that follows and to instill a better appreciation of the inventor's contribution to the art. Before an embodiment of the invention is explained in detail, it must be made clear that the following details of construction, descriptions of geometry, and illustrations of inventive concepts are mere examples of possible manifestations of the invention.

DETAILED DESCRIPTION OF PREFERRED EMBODIMENTS

To allow one skilled in the art to understand and, in appropriate circumstances, to practice the present invention, certain preferred embodiments of the invention are described in detail below and are shown in the accompanying FIGS. 1–20. With this in mind and looking more particularly to FIG. 1, one sees a preferred embodiment of the measuring jig indicated generally at 10. To enable a most clear understanding of the invention, the measuring jig 10 is shown as it would be associated with a work piece 100 during use.

Figure 1:
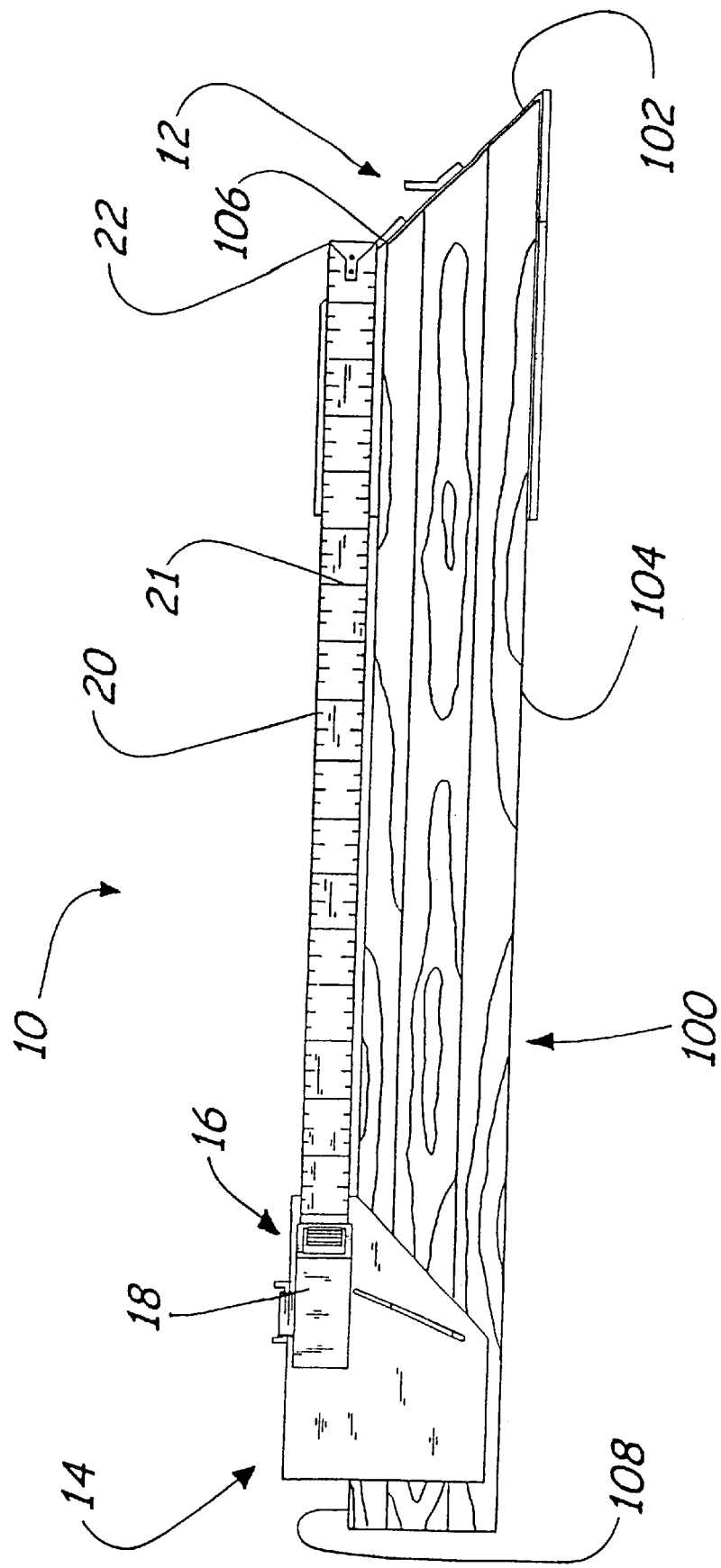
FIG. 1 is a top plan view of a measuring jig according to the present invention shown associated with a work piece and a measuring means.

As one will realize, the work piece 100 shown in FIG. 1 comprises a length of trim as might be applied about the periphery of a window or door casing (not shown). The work piece 100 has a distal end 102 comprising a mitered end face, which is also indicated at 102. The work piece 100 further includes a rear longitudinal face 104. One will appreciate that the end face 102 may be disposed at a wide variety of angles relative to the rear longitudinal face 104. Typically, however, one might expect the end face 102 to be disposed at either a forty-five (45) degree angle or a twenty-two and one-half (22.5) degree angle relative to the rear longitudinal face 104. Of course, it is well within the scope of the invention to accommodate other angles of the end face 102 including, for example, ninety (90) degrees.

In any event, one sees in FIG. 1 that the measuring jig 10 preferably comprises an end engaging member 12 for engaging the end face 102 of the work piece 100, a measuring means retaining member 14, and a measuring means 16 with a housing 18 that is retained by the measuring means retaining member 14. Although it clearly could be of many types, the measuring means 16 in this example comprises a typical tape measure with a coilable and extensible body portion 20 normally retained within a housing. The body portion 20 has measuring indicia 21 disposed thereon and a distal end 22 that is retained adjacent to a proximal end 106 of the end face 102 of the work piece 100 during use of the invention. As it comprises the point from which the work piece 100 will be measured, the proximal end 106 of the end face 102 may be termed with equal accuracy a reference point, also indicated at 106, on the work piece 100.

Figure 2:
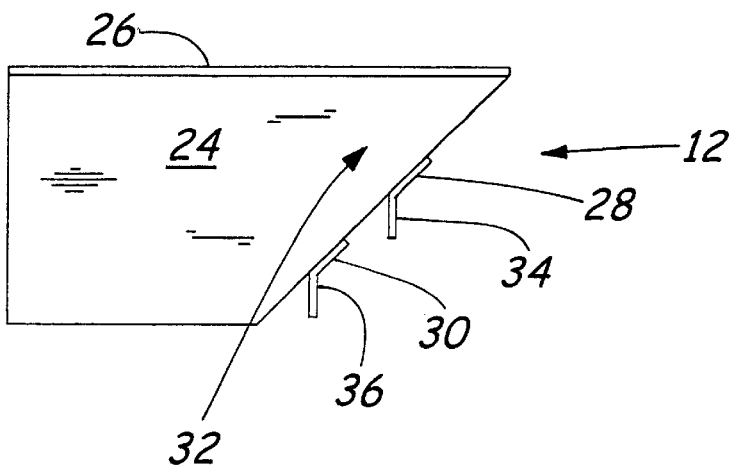
FIG. 2 is a top plan view of the end engaging member of the measuring jig of FIG. 1.
Figure 3:
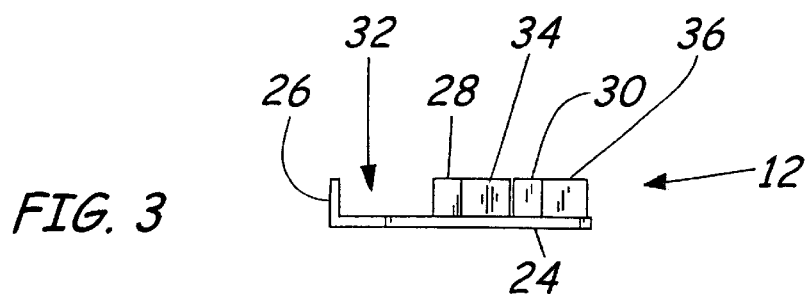
FIG. 3 is a view in front elevation of the end engaging member of FIG. 1.

FIGS. 2 and 3, respectively, provide top plan and front elevational views of the end engaging member 12 of FIG. 1. The end engaging member 12 is founded upon a base plate 24, which may also be termed a base member 24. A rear longitudinal face engaging surface 26 is fixed along one edge of the base plate 24 while a first end face engaging surface 28 and a second end face engaging surface 30 are fixed along a second edge of the base plate 24 that is angularly disposed relative to the rear longitudinal face engaging surface 26. As the figures show, the first and second end face engaging surfaces 28 and 30 together with the rear longitudinal face engaging surface 28 define a V-shaped angular alcove 32 for receiving and engaging the end face 102 and the rear longitudinal face 104 of a work piece 100.

A first lip 34 flares from the first end face engaging surface 28 to be oriented perpendicularly to the rear longitudinal face engaging surface 26, and a second lip 36 flares from the second end face engaging surface 30 to be oriented generally perpendicularly to the rear longitudinal face engaging surface 26. As such, since the body portion 20 of the measuring means 16 is aligned with the work piece 100, the first and second lips 34 and 36 readily act as means for retaining the distal end 22 of the measuring means 16 adjacent to the reference point 106 of the work piece 100. One will appreciate that the first and second lips 34 and 36 advantageously are at different distances from the rear longitudinal face 26 of the end engaging member 12 whereby they are able to retain the distal end 22 of the measuring means 16 adjacent to reference points 106 of work pieces 100 of different widths.

Figure 4:
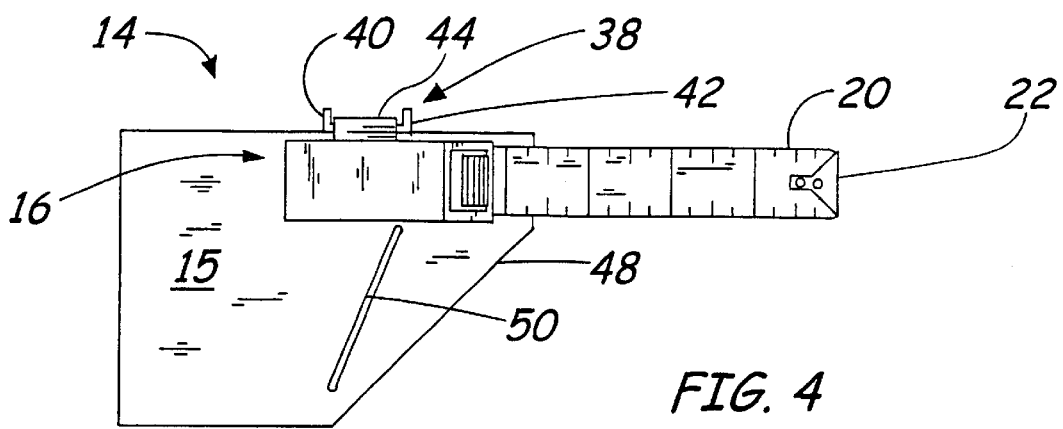
FIG. 4 is a top plan view of the measuring means retaining member of FIG. 1 shown coupled to a measuring means.
Figure 5:
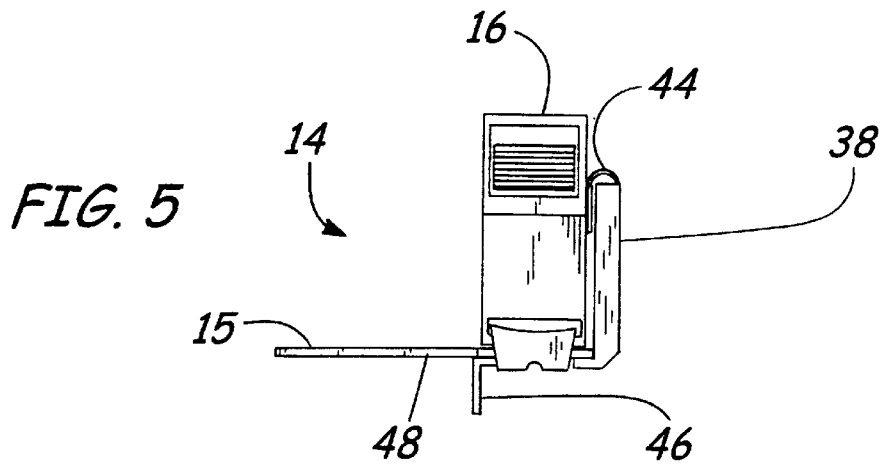
FIG. 5 is a view in front elevation of the measuring means retaining member of FIG. 1 shown coupled to a measuring means.
Figure 6:
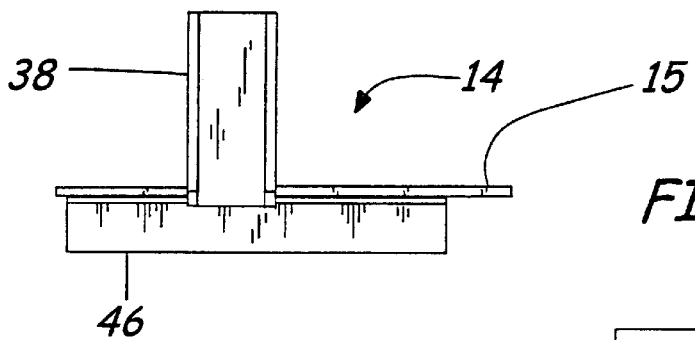
FIG. 6 is a view in side elevation of the measuring means retaining member of FIG. 1 shown coupled to a measuring means.

Turning next to FIGS. 4, 5, and 6, one sees, respectively, top, front, and side views of the measuring means retaining member 14 of FIG. 1. The measuring means retaining member 14 is founded on a base plate 15. The measuring means retaining member 14 retains the measuring means 16 by use of an upstanding elongate retaining arm 38 that has a first restraining ridge 40 disposed along a first edge of the retaining arm 38 and a second restraining ridge 42 disposed along a second edge of the arm 38. In operation, the measuring means 16 is coupled to the measuring means retaining member 14 by sliding the clip 44 that is typically disposed on a tape-measure-type measuring means 16 over the retaining arm 38 between the ridges 40 and 42 whereby the measuring means 16 is readily retained in a given measuring means orientation.

Advantageously, the measuring means retaining member 14 further includes an elongate ridge 46 fixed to the surface of the base plate 15 opposite the measuring means 16 for being disposed against a front longitudinal edge face 108 of a work piece 100 as is shown in FIG. 1. With this, the ridge 46 maintains the measuring means retaining member 14, and thus a measuring means 16 that is retained thereby, at a given orientation relative to a work piece 100.

The measuring means retaining member 14 is improved still further by the provision of a first marking edge 48 and a second marking edge 50. The first marking edge 48 comprises the leading edge of the base plate 15 and is disposed at a miter angle (e.g., forty-five (45) degrees) relative to the fixed orientation of the measuring means 16. The second marking edge 50 comprises a slot in the base plate 15 that is disposed at a second miter angle (e.g., twenty-two and one-half (22.5) degrees) relative to the fixed orientation of the measuring means 16. With this, when the ridge 46 is disposed against a front longitudinal face 108 of a work piece 100, the first and second marking edges 48 and 50 can be employed to apply cutting lines (not shown) to a work piece 100 simultaneously with the measuring operation. Of course, which marking edge 48 or 50 is used will depend on the angle to which the work piece 100 is to be cut.

In use, the measuring jig 10 represents a marked improvement over prior art methods of measuring and marking a work piece 100. Typically, a user will pre-cut one end, which may be considered the distal end, of a work piece 100 at a selected miter angle to form the end face 102. Next, the distal end of the work piece 100 will be disposed in the V-shaped angular alcove 32 with the end face 102 engaging the end face engaging surfaces 28 and 30 and the rear longitudinal face 104 engaging the rear longitudinal face engaging surface 26. The distal end 22 of the measuring means 16 will then be engaged with either the first or second lip 34 or 36 with the chosen lip 34 or 36 being the one that is disposed in alignment with the proximal end 106 of the end face 102. The extensible body portion 20 of the measuring means 16 will then be extended until reaching the indicia 21 that indicate the length to which the work piece 100 is to be cut. Once that length is reached, a cutting line (not shown) can be applied to the work piece 100 by passing a marking tool (e.g., a pencil) along either the first or second marking edges 48 or 50 depending on the angle to which the work piece 100 is to be cut. With this, a cutting line can be applied to a work piece 100 by a single user quickly, accurately, and consistently even where the length to which a work piece 100 is to be cut is significantly long.

Figure 7:
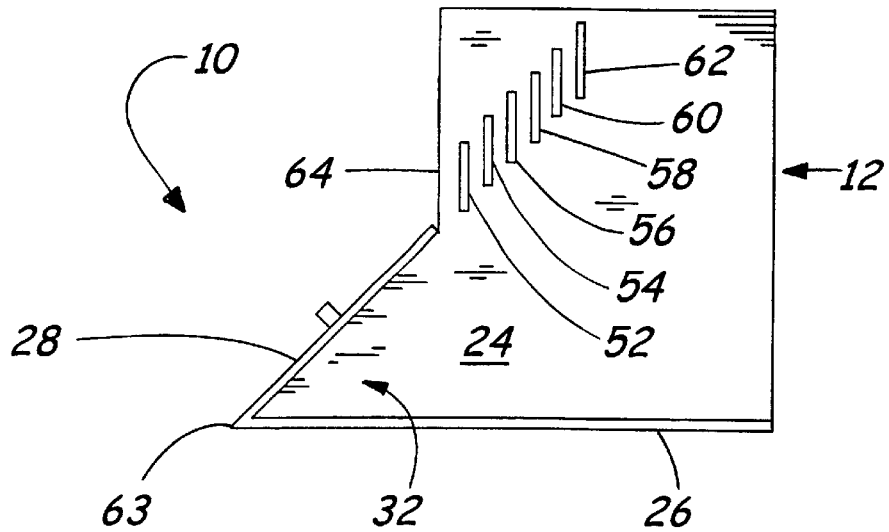
FIG. 7 is a top plan view of an alternative end engaging member.
Figure 8:
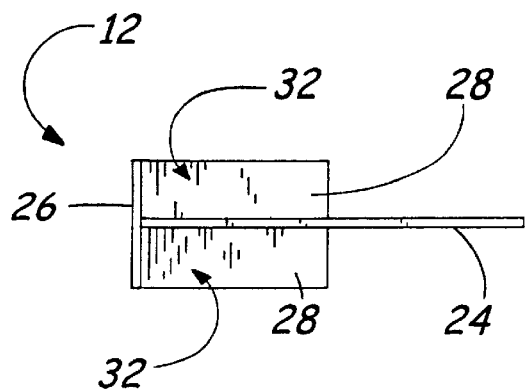
FIG. 8 is a view in front elevation of the end engaging member of FIG. 7.
Figure 9:
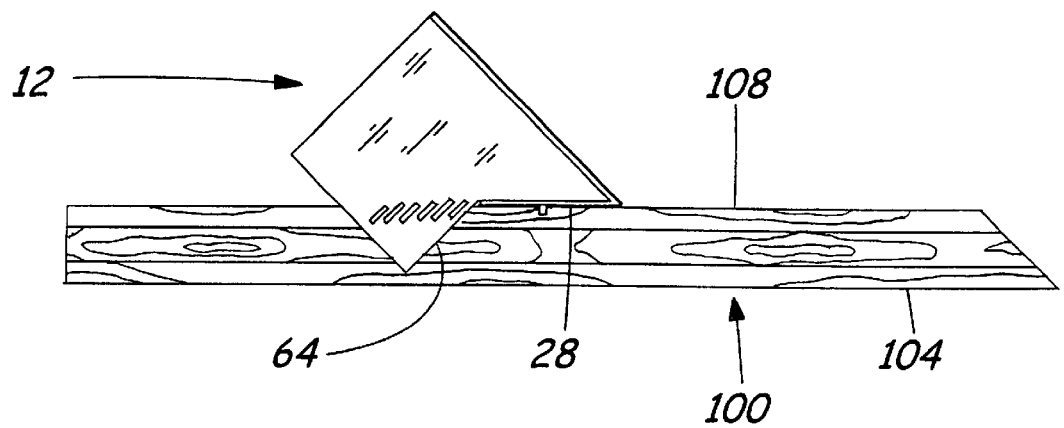
FIG. 9 is a top plan view of the end engaging member of FIG. 7 shown associated with a work piece for applying a cutting line.

With a first basic embodiment of the invention disclosed, one may turn next to FIGS. 7, 8 and 9 where an alternative embodiment of the measuring jig 10 is shown. In this embodiment, it is made clear that the measuring jig 10 could well comprise only the end engaging member 12. The end engaging member 12 again is founded upon a base plate 24 and again includes a rear longitudinal face engaging surface 26 and a first end face engaging surface 28. However, in this embodiment, there is no second end face engaging surface 30. Also, as FIG. 8 shows most clearly, the rear longitudinal face engaging surface 26 and the first end face engaging surface 28 each project from both sides of the base plate 24. As a result, the end engaging member 12 is functionally symmetrical on both sides of the base plate 24 whereby the end engaging member 12 can engage mitered end faces 102 cut in either direction by use of both sides of the end engaging member 12.

The embodiment of FIGS. 7, 8 and 9 also provides a plurality of slots 52 through 62 that act as means for retaining the distal end 22 of the measuring means 16. Advantageously, the plurality of slots 52 through 62 are spaced progressively both increasingly distant from the rear longitudinal face engaging surface 26 and increasingly distant from the tip 63 of the V-shaped angular alcove 32. As a result, the slots 52 through 62 are able to retain the distal end 22 of the measuring means 16 adjacent to the reference points 106 of work pieces 100 of a variety of widths.

A final refinement of the measuring jig 10 of FIGS. 7, 8, and 9 comes in the form of a marking edge 64 that extends from the end of the end face engaging surface 28 perpendicularly to the rear longitudinal face engaging surface 26. With this, where the miter angle to which a work piece 100 is to be cut is forty-five (45) degrees and the angle of the end face engaging surface 28 relative to the rear longitudinal face engaging surface 26 is also forty-five (45) degrees, the end engaging member 12 can be disposed on a work piece 100 as is shown in FIG. 9 with the end face engaging surface 28 disposed against the front longitudinal face 108 of the work piece 100 and the marking edge 64 overlapping the work piece 100 to allow the application of a cutting line (not shown) to the work piece 100 at an accurate forty-five (45) degree angle.

Figure 10:
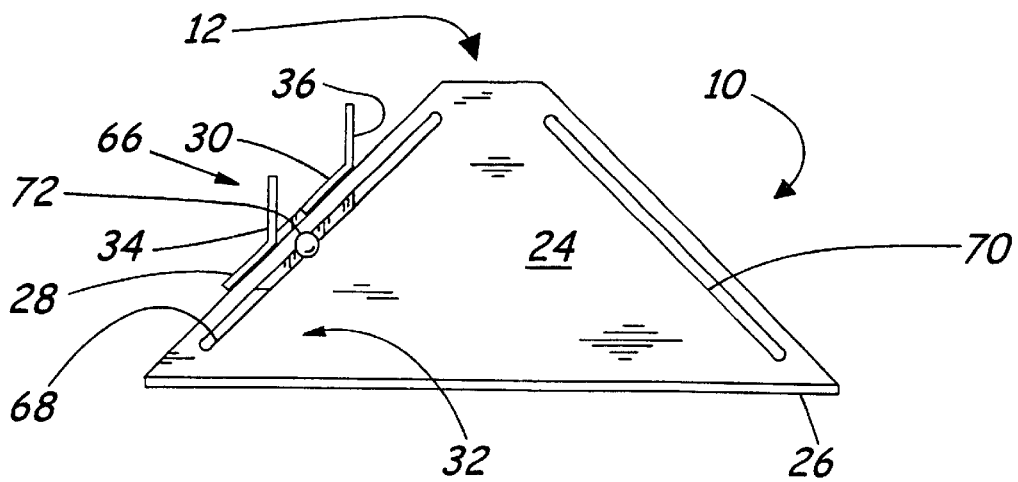
FIG. 10 is a top plan view of another alternative end engaging member.

FIG. 10 shows another manifestation of the present invention. In this embodiment, the measuring jig 10 comprises the end engaging member 12 that again starts with a base plate 24 that has a rear longitudinal face engaging surface 26 fixed thereto. The end engaging member 12 also incorporates first and second end face engaging surfaces 28 and 30 that, together with the rear longitudinal face engaging surface 26, define a V-shaped angular alcove 32. The first and second end face engaging surfaces 28 and 30 again have first and second lips 34 and 36 respectively flaring therefrom in a direction perpendicular to the rear longitudinal face engaging surface 26.

However, the embodiment of FIG. 10 is unique relative to the other embodiments in two major respects. The first is that the first and second end engaging surfaces 28 and 30 are not fixed relative to the base plate 24. Instead, they are retained on a sliding unit 66 that is shown in FIG. 10 to be slidable within a first adjusting slot 68. With this, the first and second end engaging surfaces 28 and 30 and the first and second lips 34 and 36 that project therefrom enjoy infinite adjustability over the length of the first adjusting slot 68. With this, the end engaging member 12 can accommodate work pieces 100 of a variety of widths. The sliding unit 66 may be secured in position by any appropriate means such as a bolt 72 in combination with a wing nut (not shown). The second refinement found in the design of FIG. 10 derives from the provision of a second adjusting slot 70 that permits a user to transfer the sliding unit 66 to the opposite side of the base plate 24. As a result, work pieces 100 can be measured in either direction by a simple transfer of the sliding unit 66.

Figure 11:
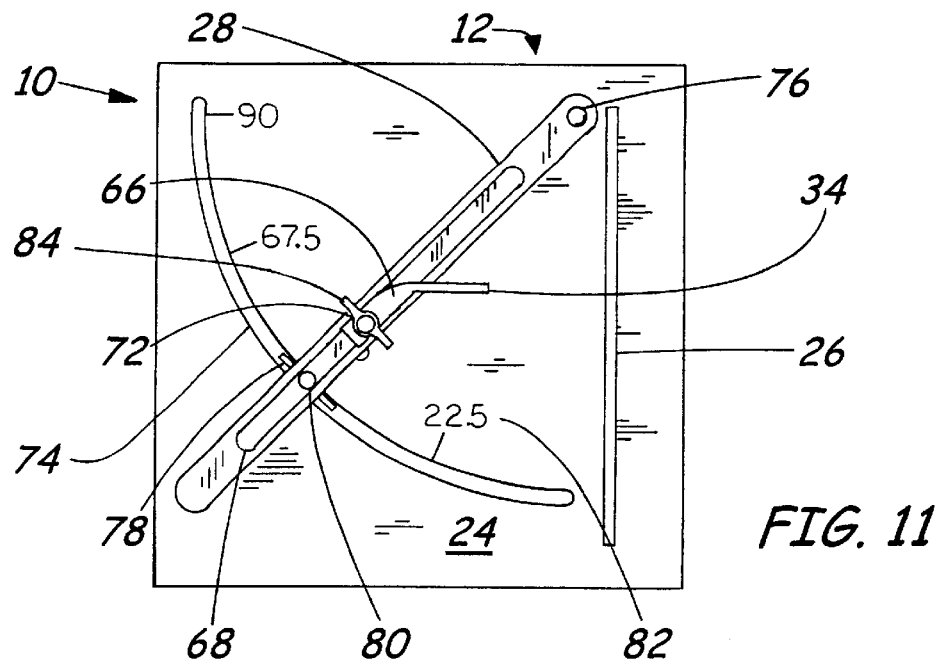
FIG. 11 is a top plan view of yet another alternative end engaging member.

FIG. 11 illustrates still another embodiment of the measuring jig 10 comprising an end engaging member 12. The end engaging member 12 again begins with a base plate 24, which in this case is square. A rear longitudinal face engaging surface 26 is fixed to the base plate 24. In this embodiment, however, there is just one end face engaging surface 28, which in this case comprises an elongate hollow body. The end face engaging surface 28 is pivotally coupled to the base plate 24 by a pivot rod 76. With this, the end face engaging surface 28 can be adjusted to accommodate work pieces 100 with end faces 102 cut at an infinite range of angles between a given minimum and ninety (90) degrees. The end face engaging surface 28 can be fixed at a given angle by means of a wing nut 78 and bolt 80 combination that slides along an arcuate adjusting slot 74. The wing nut 78 is disposed on the side of the base plate 24 opposite to the first end face engaging surface 28, and the bolt 80 is internally disposed within the hollow end face engaging surface 28 passing through the arcuate adjusting slot 74 to engage the wing nut 78. To ensure accurate angular settings, angular indicia 82 are disposed on the base plate 24. The first lip 34 again is adjustable by its being retained by a sliding unit 66 that is slidably retained by the end face engaging surface 28 to travel along an adjusting slot 68. The sliding unit 66 can be fastened in position by an internally received bolt 72 in combination with a wing nut 84.

Figure 12:
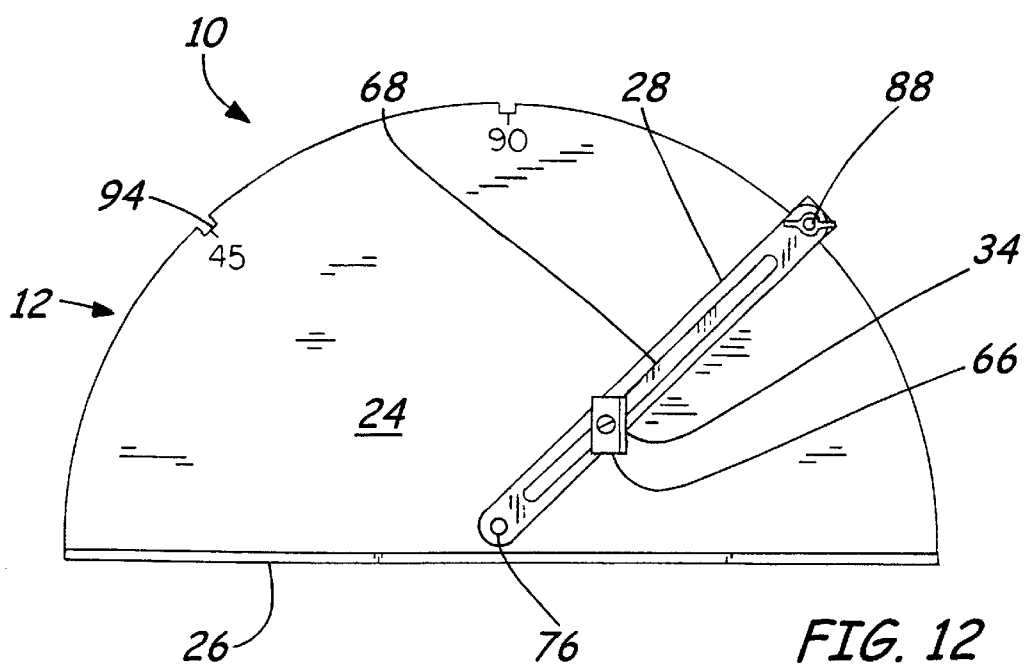
FIG. 12 is a top plan view of a still further embodiment of an end engaging member according to the present invention.
Figure 13:
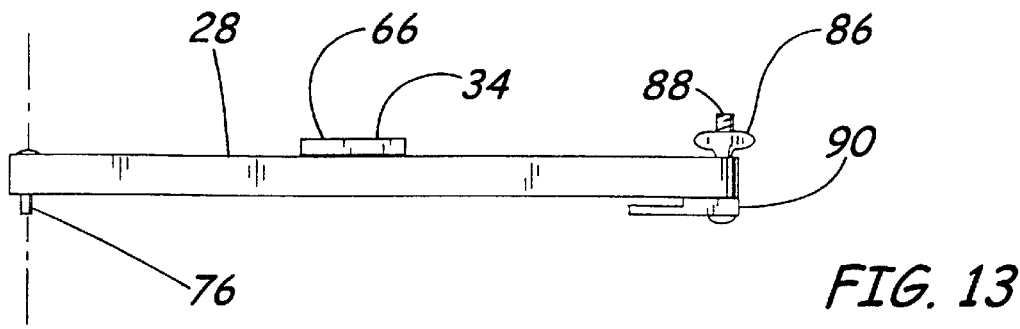
FIG. 13 is a view in side elevation of an end face engaging surface according to the present invention.

Another measuring jig 10 comprising and end engaging member 12 is depicted in FIG. 12. In this embodiment, the base plate 24 is arcuate and essentially comprises a half circle. The end face engaging surface 28 is pivotable about the pivot rod 76 to accommodate work pieces 100 cut to an infinite variety of angles and work pieces 100 disposed on either side of the end face engaging surface 28. Advantageously, the sliding unit 66 is not only slidable but is also rotatable within adjusting slot 68 whereby the first lip 34 can be rotated into appropriate orientation according to the angle at which the end face engaging surface 28 is disposed and the direction from which a work piece 100 is to be received.

The end face engaging surface 28 may be fastened at a given angle by the mechanism shown most clearly in FIG.

13 where the end face engaging surface 28 is shown apart from the remainder of the end engaging member 12. Here, the end face engaging surface 28 may be fastened into frictional engagement with the base plate 24 by rotating a wing nut 86 about a bolt 88 to induce clamping member 90 to draw the end face engaging surface 28 and the base plate 24 into frictional engagement.

Figure 14:
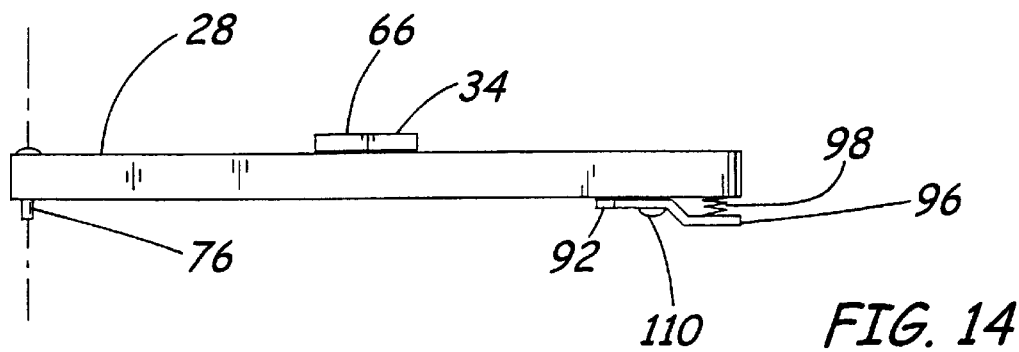
FIG. 14 is a view in side elevation of another end face engaging surface according to the present invention.

Alternatively, the end face engaging surface 28 may be secured in place by the mechanism depicted in FIG. 14. Here, the end face engaging surface 28 can be locked in place by having a locking tip 92 engage a locking notch 94 on the base plate 24. The locking tip 92 can comprise an end of a locking member 96 that is pivotable about a fulcrum bolt 110. The locking tip 92 can be biased into a locking position by a spring 98 to lock the end face engaging surface 28 at a given angle.

Figure 15:
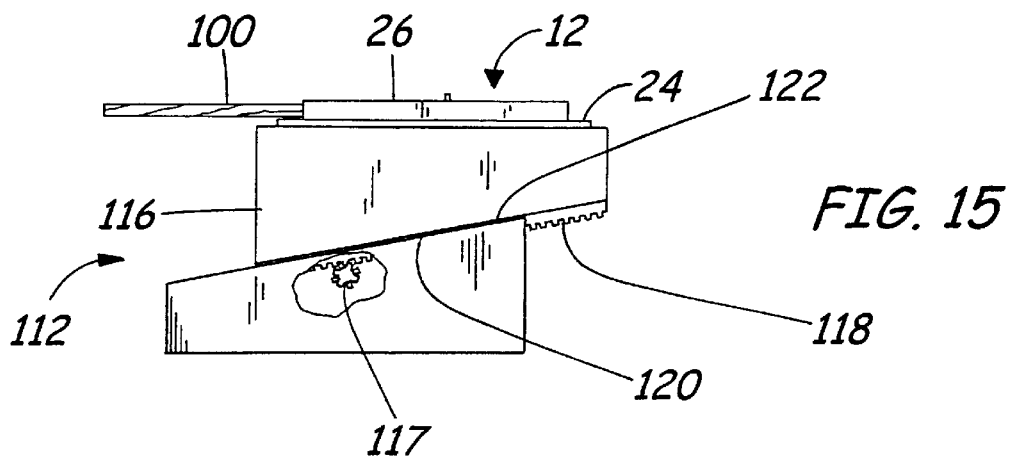
FIG. 15 is a view in side elevation of a height adjusting rack according to the present invention.

Still another refinement of the invention is found in FIG. 15 where a height adjusting rack 112 is coupled to the base plate 24 for permitting the end engaging member 12 to support a work piece 100 to provide a user with still greater convenience and consequent accuracy, speed, and consistency. Advantageously, as its name would suggest, the height adjusting rack 112 is adjustable in height by a combination of a base member 114 with an upper sloping edge 120 and an upper member 116 with a lower sloping edge 122. One will appreciate that the height at which the end engaging member 12 will be retained will vary as the upper member 116 slides relative to the base member 114. This movement can be controlled by the combination of a rack 118 and a pinion gear 117. In the embodiment of FIG. 15, rotation of the pinion gear 117 clockwise will raise the upper member 116 and thus the end engaging member 12 while rotation of the pinion gear 117 counter-clockwise will lower the upper member 116 and thus the end engaging member 12.

Figure 16:
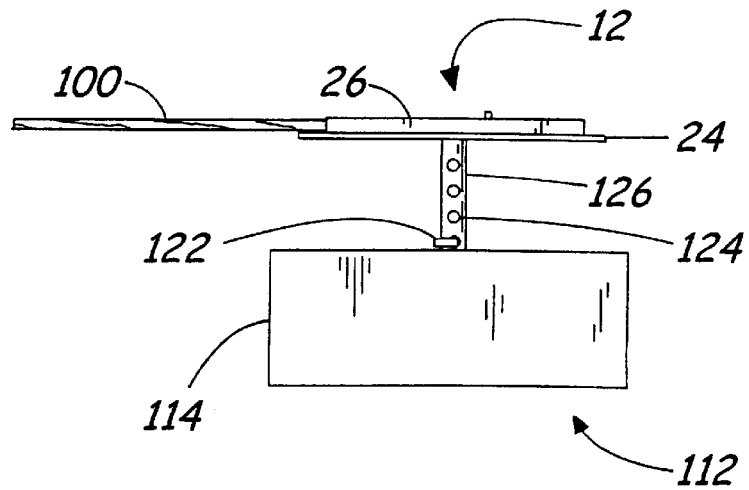
FIG. 16 is a view in side elevation of an alternative height adjusting rack.

An alternative height adjusting rack 112 is shown in FIG. 16. Here, the height adjusting rack 112 simply comprises a base member 114 with a height adjusting pole 126 received therewithin. The height adjusting pole 126 is fixed to the base plate 24. The height of the height adjusting pole 126 can be adjusted by means of an L-shaped locking rod 122 in combination with a plurality of adjusting holes 124. When the height of the end engaging member 12 is to be varied, the locking rod 122 is removed from the adjusting hole 124, the desired height is set, and the locking rod 122 is placed into the appropriate adjusting hole 124 to prevent the height adjusting pole 126 from sliding downward into the base member 114.

Figure 18:
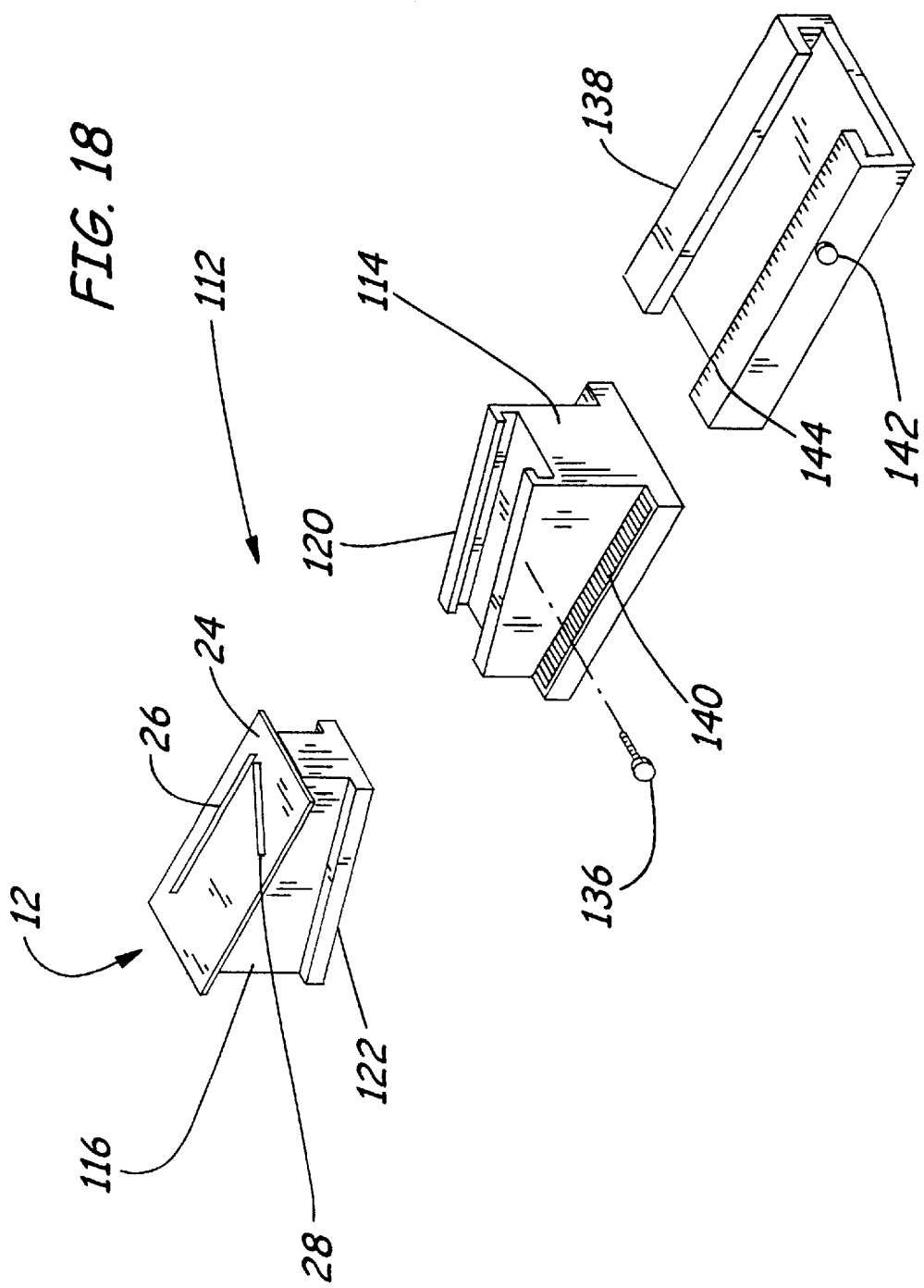
FIG. 18 is a perspective view of an alternative height adjusting rack.

Yet another height adjusting rack 112 is depicted in FIG. 18. As with the embodiment of FIG. 15, the height adjusting rack 112 is again coupled to the base plate 24. The upper member 116 is matingly received within the base member 114. The overall height of the height adjusting rack 112 may be adjusted by sliding the upper member 116 relative to the base member 114. A given height can be fixed by a rotation of a locking bolt 136 to press itself and the base member 114 into restraining frictional engagement with the upper member 116. The basic height adjusting rack 112 is improved in this embodiment by the addition of an elongate track 138 that matingly receives the base member 114. The base member 114, and thus the upper member 116, is slidably retained by the elongate track 138. With this, the distance of the end engaging member 12 from a saw blade or the like (not shown) can be adjusted to accommodate the cutting of work pieces 100 to varying lengths. Although the base member 114 could be freely slidable within the track 138, this preferred embodiment allows for precise adjustment of the location of the base member 114 by a rotation of a pinion knob 142 that controls a pinion gear (not shown) that cooperates with a rack 140 that is disposed on the base member 114. Advantageously, the track 138 has measuring indicia 144 disposed thereon for enabling a relative measurement of the distance of the end engaging member 12 from a saw blade or the like (not shown).

It should be made explicit that the height adjusting racks 112 shown and described herein are merely exemplary of presently preferred, particularly adapted means for retaining an end engaging member 12 at a given height. Certainly other embodiments are well within the scope of the invention. Furthermore, the invention could employ stands found in the prior art (not shown) for retaining the end engaging member 12. Of course, prior art stands including a means for locking the stand at a given distance away from a saw blade (not shown) of a miter saw (not shown) could be employed.

Figure 17:
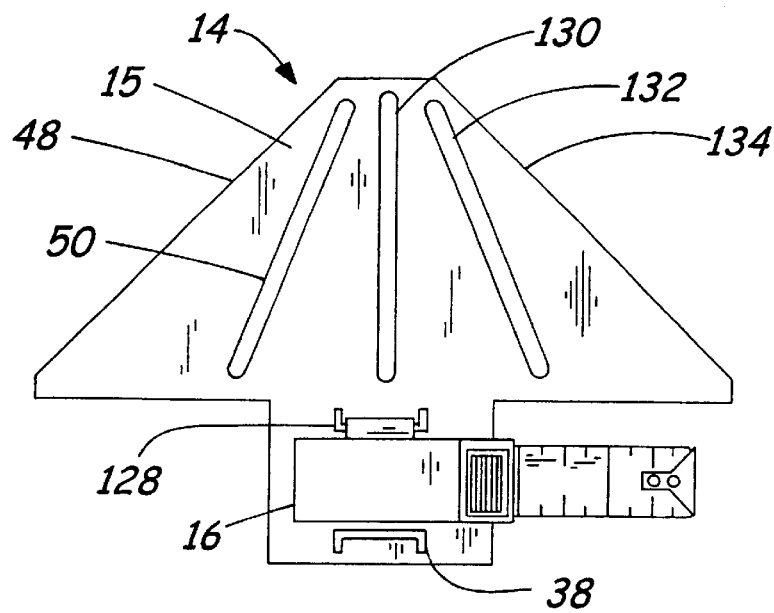
FIG. 17 is a top plan view of an alternative measuring means retaining member.

Looking now to FIG. 17, one sees an alternative measuring means retaining member 14. Here, the measuring means retaining member 14 is adapted for use in either direction. As such, the base plate 15 comprises a symmetrical triangle. The retaining arm 38, which retains the measuring means 16 when oriented in a first measuring orientation, is supplemented by a second retaining arm 128 for retaining the measuring means 16 when oriented in a second measuring orientation, which is illustrated in FIG. 17. Furthermore, the first marking edge 48 and the second marking edge 50 (disposed in this preferred example at forty-five (45) and twenty-two and one-half (22.5) degrees respectively) are supplemented by a third marking edge 130, which comprises a slot in the base plate 15 disposed perpendicularly to the orientation of the measuring means 16, a fourth marking edge 132, which comprises a slot disposed symmetrically opposite to the second marking edge 50, and a fifth marking edge 134, which comprises an edge of the base plate 15 disposed at forty-five (45) degrees relative to the orientation of the measuring means 16.

Figure 19:
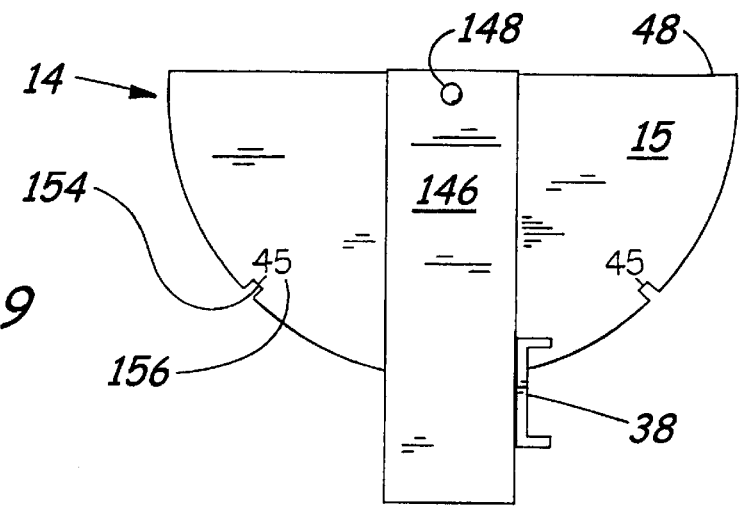
FIG. 19 is a top plan view of another measuring means retaining member.
Figure 20:
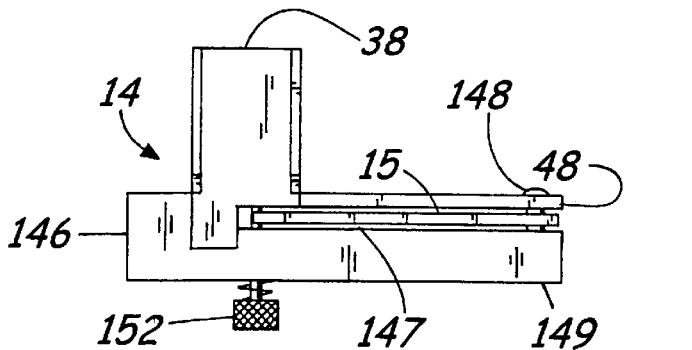
FIG. 20 is a view in side elevation of the measuring means retaining member of FIG. 19.

FIGS. 19 and 20 reveal a measuring means retaining member 14 that provides a first marking edge 48 that is infinitely adjustable between, potentially, zero degrees and ninety degrees. The measuring means retaining member 14 again is founded upon a base plate 15. In this embodiment, however, the base plate 15 comprises a half-circle and has only the first marking edge 48. Also, in this embodiment, a measuring means (not shown in FIGS. 19 and 20) may be retained on an elongate retaining element 146 by the retaining arm 38. As FIG. 20 shows most clearly, the retaining element 146 has a slot 147 therein that receives the base plate 15. The retaining element 146 rotatably retains the base plate 15 in the slot 147 by a through-bolt 148 that traverses the slot 147 and passes through the base plate 15. With this, the angle at which the first marking edge 48 is disposed relative to a retained measuring means can be varied readily by a rotation of the base plate 15 relative to the retaining element 146. One will note that the lower portion 149 of the retaining element 146 is sufficiently thick to function as did the elongate ridge 46 in previous embodiments to allow the measuring means retaining member 14 to be aligned with a work piece 100.

Advantageously, the base plate 15 can be fixed at a given angular orientation by a spring-loaded locking rod 152 in combination with a plurality of notches 154 in the base plate 15. The locking rod 152 passes through the lower portion 149 of the retaining element 146 and is biased to engage each of the notches 154 to fix the base plate 15 at a given angular orientation. Angular indicia 156 are disposed on the base plate 15 to indicate the angle at which the first marking edge 48 is disposed relative to the retaining element 146 and thus relative to the orientation of a retained measuring means. This would simultaneously indicate the angle at which the first marking edge 48 would be disposed relative to a work piece 100 if the lower portion 149 of the retaining element 14 were disposed against the front longitudinal face 108 of a work piece 100.

From the foregoing, it will be clear that the present invention provides a plurality of advantages over the prior art. For example, the measuring jig 10 readily retains the distal end 22 of a measuring means 16 adjacent to a reference point 106 on a work piece 100, which may be miter cut, that is to be measured. With this, a single user can accurately and consistently measure a length to which a work piece 100 is to be cut. Furthermore, by a multiplicity of means, the measuring jig 10 accommodates work pieces 100 of different widths and miter angles by, for example, the slidability of the sliding unit 66, the pivotability of the end face engaging surface 28, and the provision of multiple lips 34 and 36 or slots 52 through 62 for retaining the distal end 22 of the measuring means 16. Furthermore, preferred embodiments of the end engaging member 12 and the measuring means retaining member 14 are readily able to engage work pieces 100 from either direction. Still further, with the provision of the marking edges such as the first marking edge 48 and the second marking edge 50 on the measuring means retaining member 14, a user can apply a cutting line to a work piece 100 simultaneously with the measuring operation. An equally important advantage of the present invention for a measuring jig 10 derives from its portability, which allows a carpenter to transport the device to and from a work site with ease. These and other advantages will be readily obvious to one who has reviewed the present disclosure and to one who has an opportunity to take advantage of an embodiment of the present invention.

It will be clear that the present invention has been shown and described with reference to certain preferred embodiments that merely exemplify the broader invention revealed herein. Certainly, those skilled in the art can conceive of alternative embodiments. For instance, those with the major features of the invention in mind could craft embodiments of the invention which incorporate those major features while not incorporating all of the features included in the preferred embodiments.

With the foregoing in mind, the following claims are intended to define the scope of protection to be afforded the inventor, and the claims shall be deemed to include equivalent constructions insofar as they do not depart from the spirit and scope of the present invention. A plurality of the following claims express certain elements as a means for performing a specific function, at times without the recital of structure or material. As the law demands, these claims shall be construed to cover not only the corresponding structure and material expressly described in the specification but also equivalents thereof.

What is claimed is:

1. A measuring jig for measuring a work piece, the measuring jig comprising:

a measuring means for measuring a length wherein the measuring means has a distal end and a body portion;

an end engaging member with a means for engaging a distal end of a work piece; and a means for retaining the distal end of the measuring means adjacent to a distal end of a work piece for allowing a measuring of a length of a work piece by a retaining of the distal end of the measuring means adjacent to a distal end of a work piece and measuring a length to which the work piece is to be measured with the body portion of the measuring means;

wherein the means for engaging a distal end of a work piece comprises a base member, an end face engaging surface fixed relative to and projecting from the base member for engaging an end face of a work piece, and a rear longitudinal face engaging surface fixed relative to and projecting from the base member for engaging a rear longitudinal face of a work piece wherein the end face engaging surface and the rear longitudinal face engaging surface together define an alcove for receiving and engaging a distal end of a work piece; and wherein the end face engaging surface is fixed at an acute angle relative to the rear longitudinal face engaging surface whereby the end face engaging surface and the rear longitudinal face engaging surface together define a V-shaped angular alcove between the end face engaging surface and the longitudinal face engaging surface and whereby the end engaging member can be disposed in contact with a mitered end of a work piece with the end face engaging surface engaging a mitered end face of a work piece and the rear longitudinal face engaging surface engaging a rear longitudinal face of a work piece.

2. The measuring jig of claim 1 wherein the end face engaging surface comprises an elongate surface and wherein the means for retaining the distal end of the measuring means is slidably retained by the end face engaging surface whereby the retaining means can be disposed at varying locations on the end face engaging surface and at varying distances from the rear longitudinal face engaging surface and whereby the retaining means can retain the distal end of the measuring means at varying distances from the rear longitudinal face engaging surface.

3. The measuring jig of claim 1 wherein there is a plurality of slots in the base member for receiving and retaining the distal end of the measuring means wherein each of the plurality of slots is spaced at a varied distance from the rear longitudinal face engaging surface whereby the end engaging member can be employed for measuring work pieces of varying widths and wherein each of the slots is oriented perpendicularly to the rear longitudinal face engaging surface.

4. The measuring jig of claim 1 wherein the base member comprises a flat plate with a first flat side and a second flat side and wherein an end face engaging surface and a rear longitudinal face engaging surface projects from both the first and second flat sides of the flat plate of the base member whereby the end face engaging surfaces and the rear longitudinal face engaging surfaces define alcoves for receiving and engaging a distal end of a work piece to be measured on both the first and second flat sides of the flat plate and the end engaging member is functionally symmetrical relative to the first and second flat sides of the flat plate and whereby work pieces to be measured can be received and engaged on both the first and second sides of the flat plate.

5. The measuring jig of claim 1 wherein the measuring means comprises a measuring means housing, a coilable tape measure with a coilable and extensible tape comprising the body portion, an extensible free end comprising the distal end, and indicia for indicating length measurements.

6. The measuring jig of claim 5 further comprising a housing retaining member with a housing retaining means for retaining the measuring means housing.

7. The measuring jig of claim 6 wherein the housing retaining member comprises a base plate with a first surface and a second surface and a marking edge for overlapping a work piece to be measured and providing an edge for applying a mark to indicate a given measured length.

8. The measuring jig of claim 6 wherein the housing retaining means retains the measuring means housing at a given, fixed measuring means orientation for alignment with a work piece to be measured and wherein the marking edge comprises an elongate edge disposed at an angle relative to the measuring means orientation.

9. The measuring jig of claim 8 wherein the housing retaining means comprises an elongate arm with a first restraining ridge disposed along a first edge of the arm and a second restraining ridge disposed along a second edge of the arm.

10. The measuring jig of claim 8 wherein the marking edge is disposed at a miter angle relative to the measuring means orientation.

11. The measuring jig of claim 10 further comprising a second marking edge disposed at a second miter angle relative to the measuring means orientation wherein the second marking edge comprises a slot entirely through the base plate.

12. The measuring jig of claim 7 further comprising an elongate ridge disposed on the housing retaining member for being disposed against a longitudinal edge of a work piece thereby to maintain the housing retaining member, including the marking edge, at a given orientation relative to a work piece to be measured.

13. The measuring jig of claim 6 wherein the housing retaining member comprises an elongate retaining element and a base plate that is rotatably coupled to the elongate retaining element wherein the base plate has a marking edge and wherein the housing retaining means retains the measuring means housing at a given measuring means orientation whereby an angle at which the marking edge is disposed relative to the elongate retaining element can be varied by a rotation of the base plate relative to the elongate retaining element.

14. The measuring jig of claim 13 further comprising a means for locking the base plate at a given angular orientation relative to the elongate retaining element.

15. The measuring jig of claim 1 further comprising a height adjusting rack coupled to the end engaging member for supporting the end engaging member at a given height wherein the height adjusting rack comprises a base member with an upper sloping edge and an upper member with a lower sloping edge wherein the upper member is slidably mounted on the base member whereby the height at which the end engaging member is supported can be varied by a sliding of the upper member relative to the base member.

16. The measuring jig of claim 15 further comprising an elongate track wherein the base member is slidably retained on the elongate track whereby a location of the end engaging member can be varied by a sliding of the base member along the elongate track.

17. A measuring jig for measuring a work piece, the measuring jig comprising:

a measuring means comprising a measuring means housing, a coilable tape measure with a coilable and extensible tape comprising the body portion, an extensible free end comprising the distal end, and indicia for indicating length measurements;

an end engaging member with a means for engaging a distal end of a work piece wherein the means for engaging a distal end of a work piece comprises a base member, an end face engaging surface attached to the base member for engaging an end face of a work piece, and a rear longitudinal face engaging surface attached to the base member for engaging a rear longitudinal face of a work piece wherein the end face engaging surface and the rear longitudinal face engaging surface together define an alcove for receiving and engaging a distal end of a work piece wherein the end face engaging surface comprises an elongate surface and wherein the means for retaining the distal end of the measuring means is slidably retained by the end face engaging surface whereby the retaining means can be disposed at varying locations on the end face engaging surface and at varying distances from the rear longitudinal face engaging surface and whereby the retaining means can retain the distal end of the measuring means at varying distances from the rear longitudinal face engaging surface;

a means for retaining the distal end of the measuring means adjacent to a distal end of a work piece for allowing a measuring of a length of a work piece by a retaining of the distal end of the measuring means adjacent to a distal end of a work piece and measuring a length to which the work piece is to be measured with the body portion of the measuring means; and a housing retaining member with a housing retaining means for retaining the measuring means housing.

18. The measuring jig of claim 17 wherein the end face engaging surface is fixed at an acute angle relative to the rear longitudinal face engaging surface whereby the end face engaging surface and the rear longitudinal face engaging surface together define a V-shaped angular alcove between the end face engaging surface and the longitudinal face engaging surface and whereby the end engaging member can be disposed in contact with a mitered end of a work piece with the end face engaging surface engaging a mitered end face of a work piece and the rear longitudinal face engaging surface engaging a rear longitudinal face of a work piece.

19. The measuring jig of claim 17 wherein the end face engaging surface has a first end pivotally coupled to the base member adjacent to the rear longitudinal face engaging surface whereby an end face engaging angle of the end face engaging surface can be adjusted to define a V-shaped angular alcove with a selectively adjustable angle between the end face engaging surface and the rear longitudinal face engaging surface thereby enabling the end engaging member to engage work pieces with end faces disposed at differing angles relative to a rear longitudinal face of a work piece.

20. The measuring jig of claim 17 wherein there is a plurality of slots in the base member for receiving and retaining the distal end of the measuring means wherein each of the plurality of slots is spaced at a varied distance from the rear longitudinal face engaging surface whereby the end engaging member can be employed for measuring work pieces of varying widths and wherein each of the slots is oriented perpendicularly to the rear longitudinal face engaging surface.

21. The measuring jig of claim 17 wherein the base member comprises a flat plate with a first flat side and a second flat side and wherein an end face engaging surface and a rear longitudinal face engaging surface projects from each of the first and second flat sides of the flat plate of the base member whereby the end face engaging surfaces and the rear longitudinal face engaging surfaces define alcoves for receiving and engaging a distal end of a work piece to be measured on both the first and second flat sides of the flat plate, hereby the work piece engaging member is functionally symmetrical relative to the first and second flat sides of the flat plate, and whereby work pieces can be received and engaged on both the first and second sides of the flat plate.

22. The measuring jig of claim 17 wherein the housing retaining member comprises a base plate with a first surface and a second surface and a marking edge for overlapping a work piece and providing an edge for applying a mark to indicate a given measured length.

23. The measuring jig of claim 17 further comprising an elongate ridge disposed on the housing retaining member for being disposed against a longitudinal edge of a work piece thereby to maintain the housing retaining member, including the marking edge, at a given orientation relative to a work piece.

24. A measuring jig for measuring a work piece, the measuring jig comprising:

- a measuring means comprising a measuring means housing, a coilable tape measure with a coilable and extensible tape comprising the body portion, an extensible free end comprising the distal end, and indicia for indicating length measurements;
- an end engaging member with a means for engaging a distal end of a work piece wherein the means for engaging a distal end of a work piece comprises a base member, an end face engaging surface attached to the base member for engaging an end face of a work piece, and a rear longitudinal face engaging surface attached to the base member for engaging a rear longitudinal face of a work piece wherein the end face engaging surface and the rear longitudinal face engaging surface together define an alcove for receiving and engaging a distal end of a work piece; and
- a plurality of slots in the base member for receiving and retaining the distal end of the measuring means adjacent to a distal end of a work piece wherein each of the plurality of slots is spaced at a varied distance from the rear longitudinal face engaging surface whereby the end engaging member can be employed for measuring work pieces of varying widths and wherein each of the slots is oriented perpendicularly to the rear longitudinal face engaging surface.

* * * * *